(12) United States Patent
Elo et al.

(10) Patent No.: US 7,681,040 B2
(45) Date of Patent: Mar. 16, 2010

(54) METHOD FOR EMBEDDING SECURITY CODES INTO FILM DURING PRINTING

(76) Inventors: Margit Elisabeth Elo, 760 S. Hudson Ave., Pasadena, CA (US) 91106; William Bennett Hogue, Jr., 1813 Colleen Ave., Simi Valley, CA (US) 93063; Jeffrey Jason Bartley, 23625 Mill Valley Rd., Valencia, CA (US) 91355

( * ) Notice: Subject to any disclaimer, the term of this patent is extended or adjusted under 35 U.S.C. 154(b) by 1283 days.

(21) Appl. No.: 11/123,987

(22) Filed: May 6, 2005

(65) Prior Publication Data

US 2006/0049262 A1 Mar. 9, 2006

Related U.S. Application Data

(60) Provisional application No. 60/576,264, filed on Jun. 2, 2004.

(51) Int. Cl.
*H04L 9/32* (2006.01)
(52) U.S. Cl. .................. 713/176; 380/203; 347/225; 347/255
(58) Field of Classification Search .............. None
See application file for complete search history.

(56) References Cited

U.S. PATENT DOCUMENTS

| 4,108,537 A | 8/1978 | Watson et al. |
| 6,795,158 B1 | 9/2004 | Reynolds et al. |
| 6,930,759 B2 * | 8/2005 | Roddy et al. .................. 355/67 |
| 6,980,226 B2 * | 12/2005 | Jones et al. .................. 347/225 |
| 7,227,671 B2 * | 6/2007 | Zolla et al. .................. 358/3.28 |
| 2004/0240705 A1 * | 12/2004 | Lubin et al. .................. 382/100 |

* cited by examiner

*Primary Examiner*—Jung Kim
(74) *Attorney, Agent, or Firm*—Robert D. Shedd; Robert B. Levy

(57) ABSTRACT

A method of embedding a security mark or code on a film during the printing process is provided. The security mark or code includes unique print identification information that can be tracked to determine sources of piracy. The security code is incorporated to the film print in the form of a shift in the light exposure (e.g., color density) of pre-selected frames within pre-selected zone of pre-selected scenes. By shifting the color density and thereby marking a particular zone within a scene, these markings can be used to place a unique print ID onto the film print. This embedded security code (e.g., print ID) will be virtually undetectable to the viewer and film pirates; yet will enable the identification of the film source in the event of piracy.

14 Claims, 4 Drawing Sheets

21

METHOD FOR EMBEDDING SECURITY CODES INTO FILM DURING PRINTING

CROSS REFERENCE TO RELATED APPLICATIONS

This application claims the benefit under 35 U.S.C. 119(e) of U.S. Provisional Patent Application 60/576,264 filed Jun. 2, 2004, the entire contents of which is incorporated herein by reference.

TECHNICAL FIELD

The present invention relates to the printing of motion picture film. More particularly, the present invention relates to the application of security codes to film during film printing.

BACKGROUND ART

The process of printing a motion picture film entails projecting light of varying intensity onto unexposed film stock. In the course of printing a motion picture film, a security code or other type of identifier is often printed onto the film in an effort to uniquely identify each print that is made. The identification of the print enables the motion picture studio that produced the film to track the location of the various film prints, which aids in fighting piracy. In the event piracy occurs, the security code on the pirated film will assist in the identification of the source of the pirated film. In this respect, the code can, among other things, uniquely identify a theater that received the film print for public viewing. Thus, these identifying security codes can provide a studio with information relating to the theater from which the piracy occurred. From such information, the studio can track the piracy patterns and develop and implement theft controls.

One known technique for adding such security codes is the Cap Code technique, which applies a unique pattern of codes to each print. The pattern of codes is repeated every twenty feet (20') or so throughout each reel of the film. However, this approach appears to have lost its viability due to the increase in compression employed during film making and recording. In addition, this security technique can incur certain disadvantages. For example, the cap code technique has a limit of approximately 2000 unique dot combinations. Further, the image rarely survives capture and compression. Further, and all of the dots added as codes are required in order to decode the print number. In other words, it is not possible to decode a partial pattern.

Recent trends in technology have enabled film pirates to discover the use of such security codes on the film prints. Thus, such pirates constantly attempt to thwart such security codes and subsequent identification of the film source by eliminating them from the reproduced copies.

Thus, a need exists to provide security codes on a film during printing that are undetectable to pirates, and that do not impair the image quality and hence, the viewing experience of viewers. Furthermore, a need exists to provide security codes on film prints that not only uniquely identify each print, but also survive capture and compression to 150 k. Additionally, a need exists to minimize the security code required on the print, as well as to make such codes invisible to the viewing audience and to facilitate decoding, thereby allowing the use of such codes as evidence of piracy.

BRIEF SUMMARY OF THE INVENTION

In accordance with one aspect of the invention, a security code is embedded in a motion picture film during the film printing process. The method for providing a security code on a motion picture film during film printing commences by exposing the film to light, for example, to red, green and blue light directed at the film. A security code is generated by identifying at least one location on the motion picture film which will have a shift in light density, and controlling the exposure of the light during the printing process to impart the shift in the light density at the at least one location.

According to another aspect of the invention, a method for embedding at least one security code on a motion picture film during film printing commences by obtaining security code information from an external source, the security code information including film location information for placement of the security code. The security code information is provided to a light valve controller connected to a film printing apparatus. The film position is determined during printing, and the light valve controller is controlled to vary the light exposure at the film location intended for placement of the security code.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar components throughout the views.

DETAILED DESCRIPTION

Figure 1:
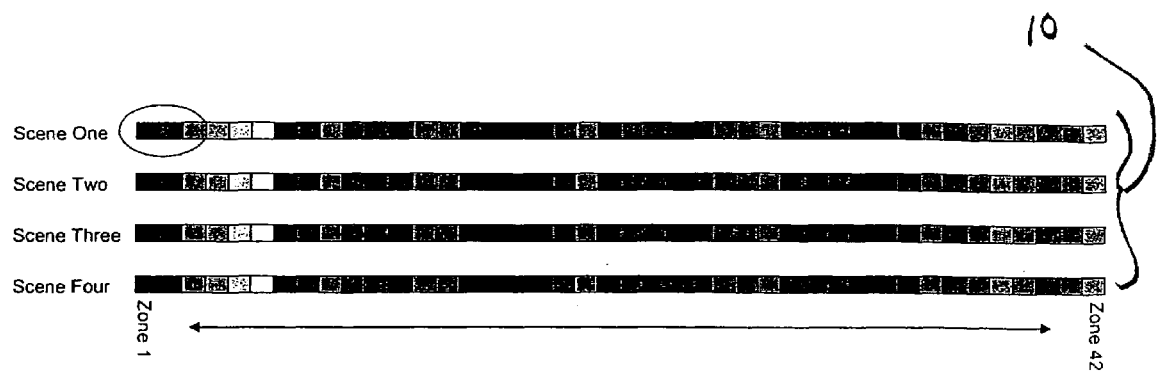
FIG. 1 depicts a schematic view of four exemplary scenes on a length of motion picture film, each scene subdivided into forty-two zones.

In accordance with an aspect of the invention, a security code can be applied to a film print by creating density shifts in the printing process. By way of example, FIG. 1 shows four separate length of a single motion picture film 10, each separate length containing one of four scenes, identified as scene one, scene two, scene three and scene four, respectively. Each scene is subdivided into 42 zones.

Figure 2:
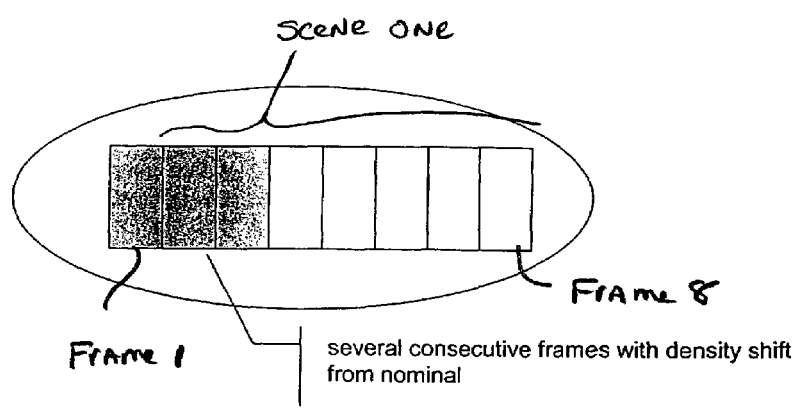
FIG. 2 is an enlarged view of a portion of one of the scenes depicted in FIG. 1, and shows a shift in density to create a security code according to an aspect of the invention.

FIG. 2 shows an enlarged portion of the first eight frames of scene one, identified as frames 1-8, respectively. In accordance with the present principles, a shift in density is applied in the printing of the film to a plurality of consecutive frames in a designated grouping of frames within a scene. This density shift from a normal density identifies the location of the security code. The locations of the density shifts determine the actual security code embedded within the film print. In the illustrated embodiment of FIG. 2, the density shift occurs in the first three frames (i.e., Frames 1-3) in scene one.

By varying the light density during film printing (such as by varying the color level, grayscale, etc) on some predetermined number of frames within at least one zone in each of a number of scenes, it is possible to obtain thousands of possible security code permutations. For purposes of this discussion, the example of varying the color density is used to describe the embedding method of the present invention. Those of skill in the art will recognize that other perceivable changes in the exposure (e.g., perceived light) in pre-designated locations on the film are also within the scope and spirit of the invention. The use of "density shift" and "changes in the perceived light" exposure are interchangeably used herein.

In the example shown in the Figures, by varying the color density on frames within one zone in each of three scenes, each scene having 42 zones (0-41), it is possible to obtain $42^3$ or 74,088 unique combinations of scenes and zones for providing a unique security code for the film print. In other words, the shift in color density identifies a numerical value corresponding to the zone within a particular scene. The scene four in the present example can be used as a checksum to confirm the coding applied to scene one, scene two and scene three.

Figure 3:
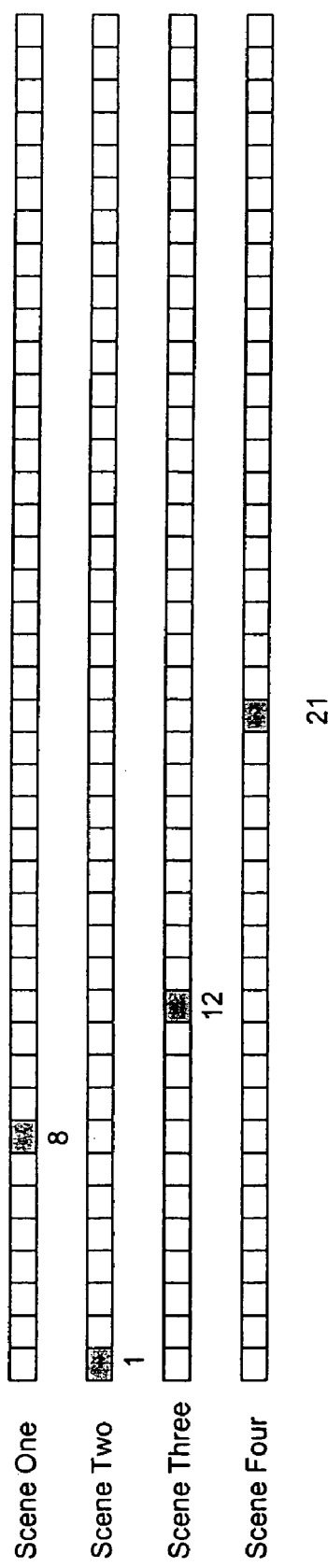
FIG. 3 is a diagrammatic representation of an exemplary security code printed on a motion picture film according to an aspect of the invention.

FIG. 3 shows an example, where four scenes are shown (i.e., scene one through scene four), with each scene having 42 zones. Each zone consists of a number of frames. In this example, the security code, to be implemented is 8, 1, and 12 (with a check sum of 21). Thus, for scene one, the $8^{th}$ zone is shown shaded (shading represents shift in perceived light or in color density), for scene two, the $1^{st}$ zone is shaded, etc. These shadings are shown for purposes of illustration. These density shifts, identify the zone number of the respective scene and in combination with the other density shifts of the other scenes, provide each film with the unique print identification used to track and identify the theater or other destination for the film print. Scene four is used as the checksum indicator and includes the density shift in zone 21 (i.e., 8+1+12=21).

With the system of the present invention, the proposed code can be implemented into a film print at 4 different scenes, where those 4 scenes can be anywhere in each reel. This makes the embedded security code virtually undetectable to the pirates.

Some of the advantages of present method of embedding the security code into the film print include: 1) a small amount of film is required to embed the code (i.e., 21 feet per density shift, x four scenes, thus entire film is not required to decode the embedded code); 2) the scene selection is independent of the code to be embedded and could be but need not be customer based; 3) unique coding (e.g., bar codes) can be printed on each reel; 4) a tracking database can be easily maintained for all security codes; 5) any pirated material can be decoded and the source of the piracy (i.e., the destination to which the original film print was sent) can be identified using the embedded security code; 6) only a small number of actual frames are marked over the entire file; and 7) decoding can occur at up to 150 k Divx compression (e.g., the embedding the code over three frames enables compression methods keep to the different video information, but the density shift doesn't occur not long enough to become objectionable or even noticeable).

Figure 4:
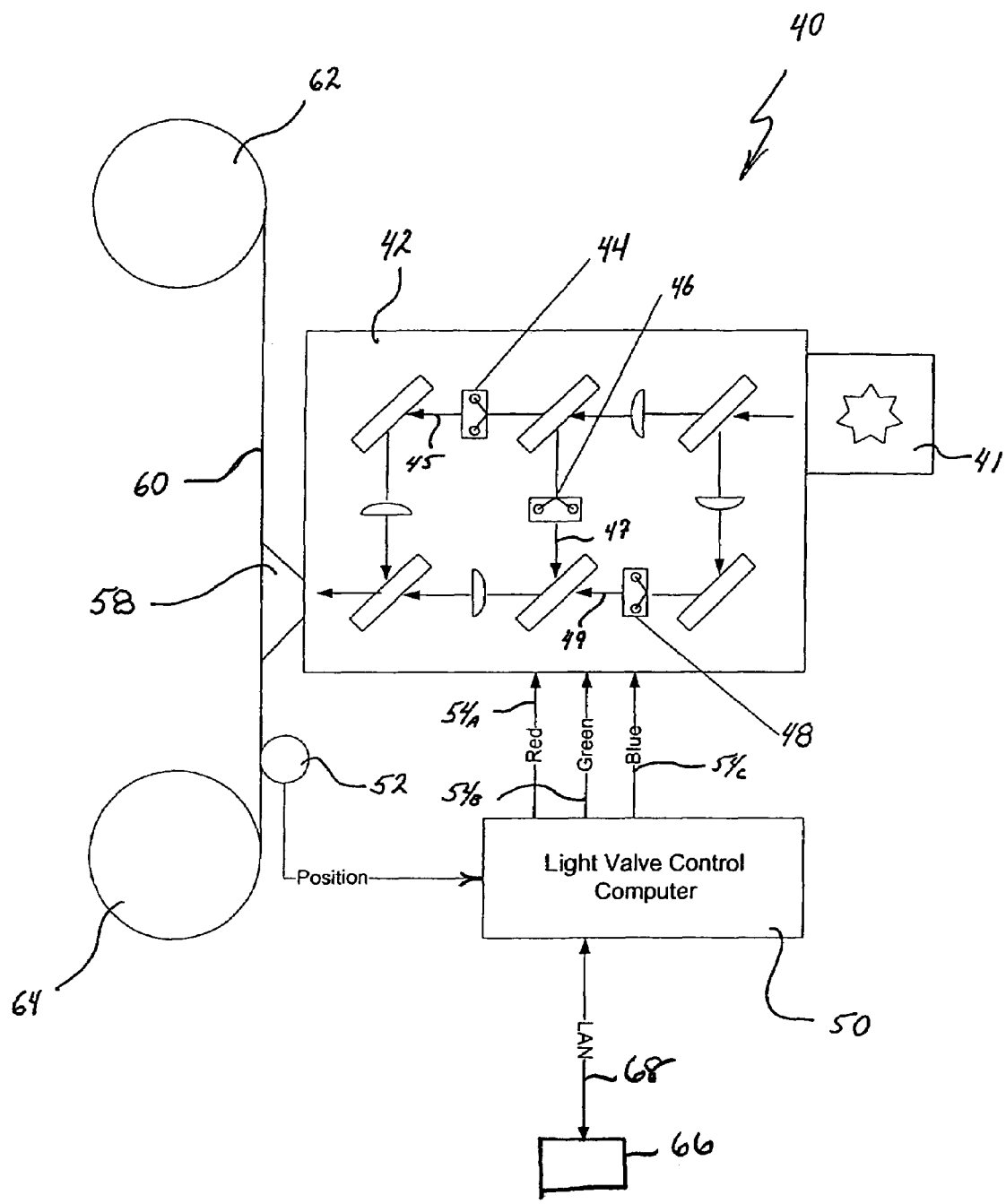
FIG. 4 is a schematic diagram of a light valve system according to another aspect of the invention.

FIG. 4 shows a block diagram of a film printing apparatus 40 using the security coding method of the present invention to print a security code on a motion picture film print. The film printing apparatus 40 includes a printer 42 having a light source 41, and a light valve controller 50. The printer 42 includes blue (44), green (46) and red (48) light valves that control the amount of the blue, green and red light, respectively, applied from the light source 41 to the film during the printing (exposure) process. The film 60 has an unexposed stock 62 that is passed by the printing head 58 of the printer 42 and accumulated on an exposed reel 64.

In accordance with one embodiment, the light valve controller 50 receives the desired security coding information for a particular film printing from a computer device 66, either directly, or through a network, such as local area network (LAN) 68. As explained above, this coding information typically includes: the scene #, zone # and frame or frames where the code is to be embedded, while also providing information as to which color or colors (e.g., red, green or blue) require variation to achieve the desired color density shift for the code printing. Those of skill in the art will recognize that the color density of one or more of the red, green and blue colors can be made at any one of the security code printing locations. Which color or colors will depend on the particular scene and frame, and can be selected on the basis of the least possible variation in the frame during actual viewing.

The light valve controller 50 obtains the film position information from a sensor 52 and based on the received position information of the film 62, the controller outputs red, green and blue command signals 54a, 54b and 54c to the printing apparatus 42. The command signals 54a, 54b and 54c control the respective red (48), green (46) and blue (44) light valves to control the amount of red light 49, green light 47 and blue light 45 that ultimately arrives at the printer head where it is recombined and exposed (58) onto the film 60 during printing.

By varying the light exposure (e.g., color density) at the selected locations (i.e., scene # and zone #), the codes can not only be embedded and hidden within the actual film, but will also not interfere with the viewing and/or compression of the film during processing. Since the security code is effectively a number code that is printed on the film using the zone numbers within more than one scene, subsequent identification of the code and the source of the film print become easy.

According to an embodiment of the invention, decoding of the embedded code (i.e., print number) can occur, even in the presence of partial density shift information. For example, the availability of any three of the four scenes permits decoding of the print identifier using any three scenes number since the last scene constitutes a sum of the others. If less than three scenes are available, additional detective methods for decoding can be employed. For example, if only two scenes are available, then the print number is one of only 42 possibilities. Such information can be sufficient to determine a single print number if all print numbers had the same missing code due to a limited release of prints. Other factors such as sound track language and known print defects can also play a part in decoding.

Figure 5:
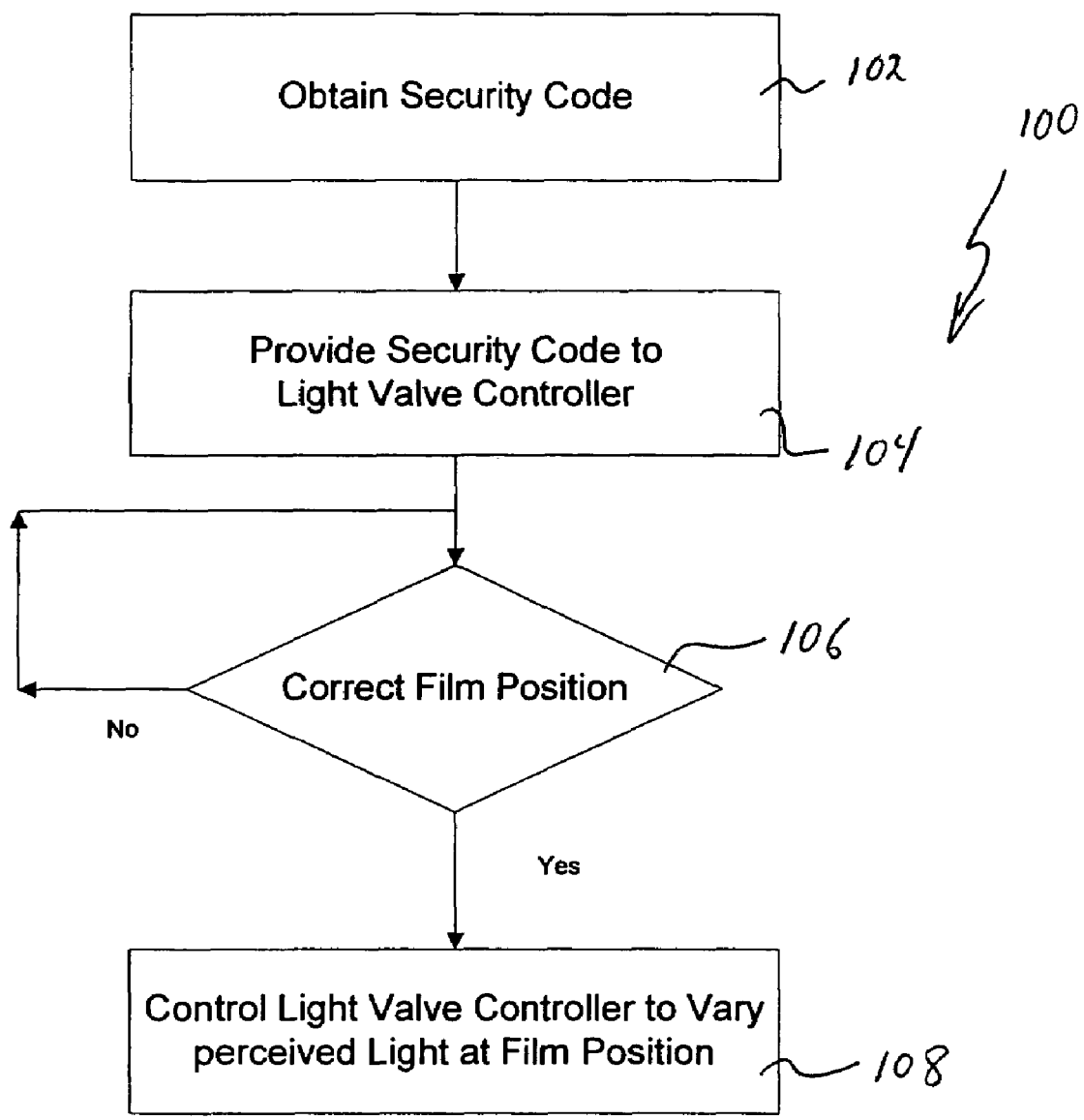
FIG. 5 is a flow diagram of the method for printing a security code on the film.

FIG. 5 shows an a flow chart illustrating the steps of an exemplary method 100 for printing a security code on a film during printing according to an aspect of the invention. Initially, the security code is obtained or generated during step 102 for use as a Print identifier on the film undergoing printing. The light valve controller 50 of FIG. 4 receives the Security code during step 104 of FIG. 5. As explained above, when printing begins, the light valve controller 50 receives the film position information at all times via sensor 52 of FIG.

4. Once the correct film position has been determined during step 106, the light valve controller 50 of FIG. 4 changes the perceived light at the desired film position during step 108 of FIG. 5. This process continues until completion of film printing.

While there have been shown, described and pointed out fundamental novel features of the invention as applied to preferred embodiments thereof, it will be understood that various omissions, substitutions and changes in the form and details of the methods described and devices illustrated, and in their operation, can be made by those skilled in the art without departing from the spirit of the invention. For example, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention can be incorporated in any other disclosed, described or suggested form or embodiment as a general matter of design choice. It is the intention, therefore, to be limited only as indicated by the scope of the claims appended hereto.

The invention claimed is:

1. A method for providing a security code on a motion picture film during printing, comprising the steps of:
   generating a security code identifying at least one location comprising a zone within a scene on the motion picture film which will have a shift in density; and
   controlling the exposure of the film during the printing process to impart the shift in density at the at least one location.

2. The method according to claim 1, wherein said security code further includes a unique print identifier ID for the particular film being printed.

3. The method according to claim 2, wherein said at least one location corresponds to said unique print identifier.

4. The method according to claim 1, further comprising applying the shift in density to at least two consecutive frames within the zone of the scene.

5. The method according to claim 1, wherein said controlling further comprises:
   determining a film position within a film printing apparatus corresponding to the at least one location for the security code; and
   repeating the controlled exposure of light for said at least one location until film printing is complete.

6. A method for embedding security codes on a motion picture film during film printing by exposure to light, the method comprising the steps of:
   obtaining security code information from an external source, said security code information including film location information comprising a zone within a scene on the motion picture film for placement of the security code;
   providing the obtained security code information to a light valve controller connected to a film printing apparatus;
   determining film position information during printing; and
   controlling the light valve controller to vary the light exposure at the film location.

7. The method according to claim 6, wherein said security code information is provided over a network.

8. The method according to claim 6, wherein said security code comprises a unique print identifier for the film print.

9. The method according to claim 6, wherein the film position is determined by a position sensor connected to the light valve controller.

10. The method according to claim 6, wherein the light exposure variation can be performed at any color level.

11. The method according to claim 10, wherein the light exposure variation comprises varying a color density of at least one of red, green and blue colors at the film location.

12. Apparatus for embedding security codes on a motion picture film during film printing by exposure to light, comprising:
   means for obtaining security code information, including film location information comprising a scene having at least one zone within which the security code is to be embedded;
   means for providing the obtained security code information to a light valve controller connected to a film printing apparatus;
   means for determining film position information during printing; and
   controlling the light valve controller to vary the light exposure at the film location in accordance with the security code information.

13. The apparatus according to claim 12, wherein said security code comprises a unique print identifier for the film print.

14. The apparatus according to claim 12 wherein the determining means comprises a position sensor connected to the light valve controller.

* * * * *